July 4, 1950  R. B. KLEINFELD  2,513,492
ENGINE CYLINDER
Original Filed Feb. 12, 1944

INVENTOR.
RUDOLPH B. KLEINFELD
BY
Stoodling and Kroot
ATTORNEYS

Patented July 4, 1950

2,513,492

UNITED STATES PATENT OFFICE 2,513,492

ENGINE CYLINDER

Rudolph B. Kleinfeld, West Salem, Ohio

Original application February 12, 1944, Serial No. 522,045, now Patent No. 2,447,508, dated August 24, 1948. Divided and this application October 16, 1947, Serial No. 780,203

2 Claims. (Cl. 123—193)

The invention of the present application is a division of that shown and described in my copending application Serial No. 522,045, filed February 12, 1944, now Patent No. 2,447,508, issued August 24, 1948.

The invention relates to cylinders for engines designed to be operated by an elastic fluid under pressure. The said engine may, of course, be used also as a pump for compressing an elastic fluid. While the improved design may be described in connection with an engine cylinder, it is to be understood that the invention applies to cylinder liners just as well.

Desirable features in an engine cylinder are simplicity, durability and ease of maintenance, and these features are generally obtained within practical limitations on engines now in use. However, cylinders are deficient in their inability to resist for extended time periods the penetration of combustion gases, dirt and carbon into the space between the piston and the wall of the cylinder. In ordinary engine practice in which the pistons are directly connected to their cranks by a connecting rod, the resulting angularity between the piston connecting-rod and the line of travel of the piston sets up comparatively heavy lateral pressures between the piston and the side walls of the cylinder. The lateral pressures between the piston and cylinder walls of an engine greatly increase the difficulty of maintaining perfect fits and satisfactory lubrication in the cylinder. These difficulties are especially noticeable in engines operated by elastic fluids where high temperatures and pressures are produced in the engine cylinder, and where great attention must be given to lubrication, inasmuch as the expanding mixture of gas and air frequently contains a considerable amount of dust and grit in addition to the varying percentages of carbon. Consequently, as wear develops, carbon is forced in along the side walls of the piston to such an extent that it covers not only the walls of the piston but the piston rings and fills the piston ring grooves so that the required radial movement of the rings in and out of the grooves is prevented, with the result that the hot gases from the engine will pass around the piston rings to thereby burn out of the lubricant between the piston and the cylinder wall and overheat and burn the piston surface.

One of the objects of the invention is to provide a cylinder which is simple in construction, durable and which can be economically manufactured and maintained.

Another object is to provide a cylinder wall having a counterbore to prevent breakage of the piston rings.

A further object of the invention is to provide a cylinder construction which will prevent the leakage of combustion gases and passage of gritty carbon beyond the piston rings for a longer period and even after a considerable amount of wear has taken place in the cylinder.

A further object is to provide a cylinder construction which will prevent the overheating and fusing of the piston.

A still further object is to provide a cylinder construction which will permit effective lubrication of the piston and piston rings of the engine for a longer period under normal operating conditions.

Further objects of the invention and novel features of the cylinder construction will be apparent from the following specification when considered together with the accompanying drawings, in which.

Figure 3:
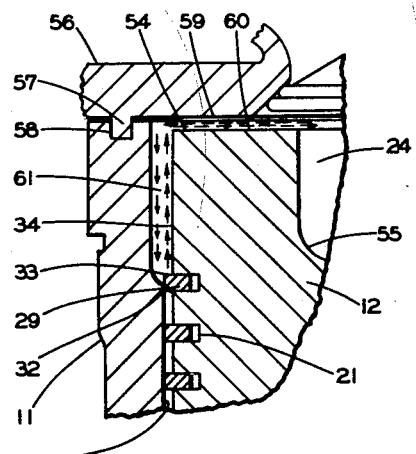
Fig. 3 is an enlarged fragmentary cross-sectional view of a portion of the cylinder liner and piston shown in Fig. 1.
Figure 1:
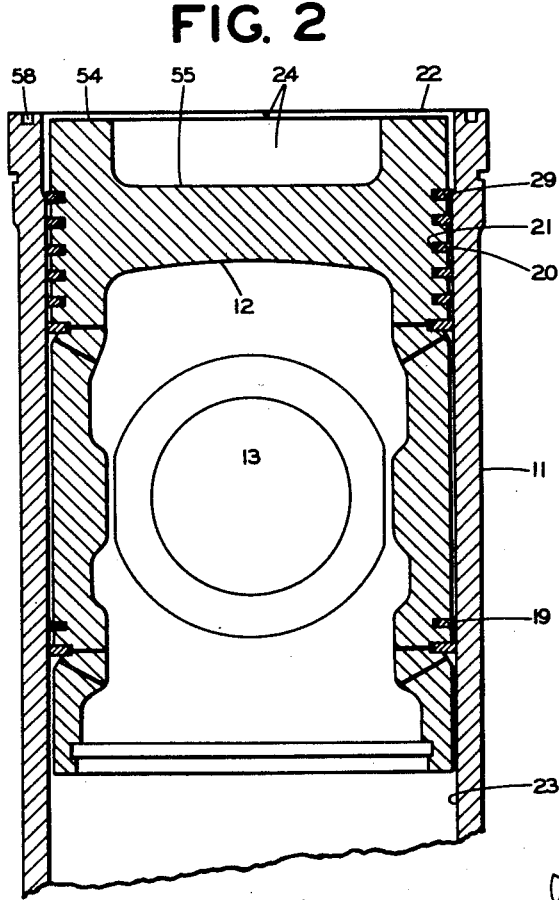
Fig. 1 is an enlarged vertical section of a portion of the cylinder liner and piston of an engine embodying the invention.

In the drawing, I have illustrated in Fig. 1, an engine cylinder liner 11, a piston 12 and a piston wrist pin 13. In Figs. 1 and 3 the piston is shown in its uppermost position. The cylinder liner 11 is adapted to be removably fitted into an engine cylinder block of any conventional type.

In the surface of the piston are mounted piston rings 19 and 20, these being normally free for radial movement in suitable ring grooves 21 provided in the surface of the piston in the conventional manner. As the piston reciprocates in the cylinder the piston rings have sliding contact along a portion of the inside surface of the cylinder liner, which portion for the purpose of describing the invention I designate as the working bore of the cylinder. In the particular type of cylinder shown in Fig. 1, the working bore comprises approximately nine tenths of the length of the cylinder. The remaining inside surface of the cylinder is not traversed or contacted by the piston rings, and I designate this portion of the cylinder as the non-working bore of the cylinder. In the type of cylinder liner shown in Fig. 1, the non-working bore extends from the cylinder head end 22 of the cylinder liner to the working bore of the cylinder liner indicated at 23 in Figs. 1 and 3.

In the operation of the engine the first down-stroke of the piston 12 draws in a charge of air alone, into the cylinder or cylinder liner 11. On the up-stroke the air in the cylinder is compressed in the compression space 24 to an extremely high pressure and has in consequence a very high temperature. At the end of the up-stroke, a small quantity of oil is blown into the compression chamber 24 where is is ignited by the high temperature of the air compressed in the chamber 24. This injection and combustion of the oil fuel continues during a small fraction of the down-stroke, and the expansion of this hot gaseous mass then continues to the lower end of the stroke, when the exhaust valve opens and remains so during the second up-stroke.

Figure 2:
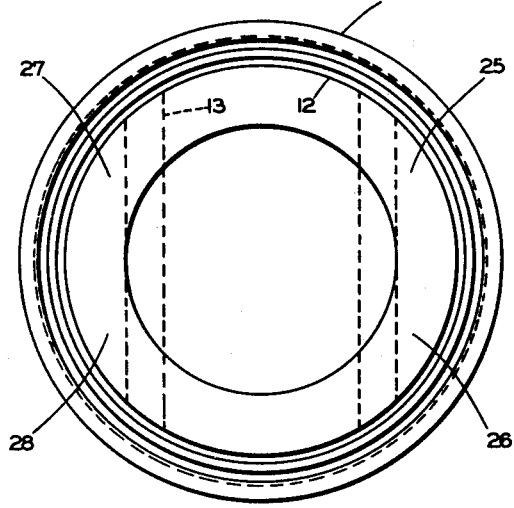
Fig. 2 is an enlarged end view of the cylinder liner and piston shown in Fig. 1.

After an engine having a cylinder liner of the general type illustrated in Fig. 1 has been in service for a period that portion of the cylinder wall which is subjected to the reciprocating action of the piston rings becomes worn down from its normal surface. In addition to the reciprocating motion the piston also exerts a lateral pressure against the cylinder walls due to the action of the connecting rod on the wrist pin and this pressure is accentuated at the combustion end of the cylinder where the piston changes its direction of motion and in the walls of the cylinder facing the side surface of the wrist pin so that the bore of the cylinder tends to become elliptical at those places, those worn elliptical portions being indicated at Fig. 2 as extending from 25 to 26 on one side and from 27 to 28 on the other side of the bore of the cylinder. As the cylinder wall wears away a ridge is formed in the wall at the point where the piston ring 29, Figs. 1 and 3 nearest the compression space 24 reaches its farthest point of travel from the crank shaft. As the ring 29 repeatedly strikes this ridge, the corner of the ring is worn away until a bevel is formed thereon as indicated by the dotted line 30 in Fig. 4. As this bevel forms on the ring, the latter is wedged into the ring groove with the result that the ring will break up into pieces. One or more of the broken pieces of the ring will soon be forced out of its ring groove and become wedged in between the piston and the cylinder wall thereupon forcing the piston up against the opposite wall of the cylinder. This leaves a comparatively large opening between the piston and one side wall of the cylinder where the flame from the combustion chamber in the cylinder will penetrate, thereby burning the piston. The pieces of the broken piston rings which become wedged between the piston and the cylinder wall often score the cylinder so that it must be rebored or replaced before the engine can again be operated. I have found upon inspection of Diesel engine cylinders and pistons that have been in service in a Diesel locomotive for a period of 6 to 8 months, that the top rings of several cylinders had been broken, one of them into as many as 27 different pieces. Some of these pieces had actually been doubled over upon themselves, the upper parts of the piston had holes burned in the surface thereof 3" long, 3" wide and ¼" deep, and the cylinders were so badly scored they were unfit for further use. Due to the failure of the top rings the flame and combustion gases had been forced down between the pistons and cylinder walls and large quantities of carbon had been deposited on the piston, on the other lower rings and in the ring grooves to such an extent that the rings and ring grooves were solidly caked in the carbon, thus preventing the normal radial expansion of the rings, and thereby deterring lubrication of the pistons, rings and engine cylinder. This condition of the engine became noticeable when the engine began to lose its power. The engine would speed up at times and then slow down, which in engine parlance is called "hunting." Large quantities of black smoke would appear in the exhaust, indicative of the fact that the engine cylinders were losing compression with the result that unburned fuel oil would be ejected into the exhaust. Upon failure of the top rings and the subsequent burning of a hole in the piston, the compression of the engine became reduced to the point where the fuel injected into the engine would not ignite.

After a careful inspection of an engine damaged in the manner described, I have concluded that one of the principal contributing factors which resulted in this unsatisfactory operating condition, was the ridge formed by the piston ring partway around the cylinder wall at the point where the piston ring nearest the combustion chamber 24 reaches its farthest point of travel from the crank shaft.

As hereinbefore pointed out, the especial object of my invention is, therefore, to provide an engine cylinder on which the formation of the aforementioned ridge or obstruction cannot occur. To accomplish this and the other objects already set forth, an engine cylinder constructed according to my invention is counterbored at the combustion chamber end of the cylinder to a point from ⅓ to ½ of the thicknes of the piston ring below the place where the upper edge 31 of piston ring 29 nearest the combustion chamber of the cylinder reaches its farthest point of travel from the crank shaft. In other words, the counterbore may extend throughout the entire length of the non-working bore and slightly into the working bore of the cylinder, but care must be taken to make certain that the counterbore will not be extended in a direction away from the combustion chamber of the cylinder beyond the point of farthermost reach or travel of the lower edge 32 of the top piston ring 29 in the cylinder from the crank shaft. If the counterbore were extended into that portion of the working bore of the cylinder contacted by the lower edge 32 of the ring 29 as viewed in Figs. 3 and 4 then the lower edge of the piston would strike the bottom of the counterbore upon the return stroke of the piston, and thereby soon break not only the ring, but the piston and cylinder as well. I preferably make this counterbore with a diameter approximately equal to the depth to which the cylinder wall will normally be worn by the action of the piston rings.

The end wall of the piston 12 is provided with a peripheral marginal edge surface 54 and a centrally disposed recess surface 55 having a diameter less than the diameter of the piston and defining a cup-shaped fluid chamber 24 of substantial depth in the central portion of the end wall 53 of the piston. On the end of the liner 11 is seated the cylinder head 56 sealed to the liner 11 by means of a tongue 57 and a groove 58. The cylinder head 56 is provided with a bottom wall 59 substantially in a plane with the end of the liner 11 enclosing or covering the fluid chamber 24. As shown in Figs. 1 and 3 the piston 12 is adapted to have the marginal edge surface 54 thereof in close proximity to the bottom wall 59 of the cylinder head when the piston 12 has reached its farthest throw toward the cylinder head 56 so that when the piston is in this position there is formed between the juxtapositioned cylinder head wall 59 and the peripheral marginal edge surface 54 of the piston a narrow restricted disk-like conduit 60 extending from the centrally disposed cup-shaped chamber 24 of the piston to the cylindrical wall 34 of the piston communicating with the annular conduit 61 defined by the wall of the liner 11 and the cylindrical wall of the piston. Thus each time the marginal edge surface 54 of the piston reaches its closest proximity to the end of the cylinder liner adjacent the cylinder head there is formed a tortuous restricted conduit for the passage of the combustion gases and products from the fluid chamber around the end of the piston and down to the top surface of the piston ring in the piston nearest the combustion end of the cylinder liner.

In a cylinder for a Diesel engine which I have used, having a normal inside diameter of 12½" and a length of 30¾", I have found that a counterbore as described having a diameter of 12.521" and a length of approximately 2½" was sufficient and I have successfully operated on engine with all of its cylinders counterbored in this manner for more than 9 months, and there has been no indication of any loss in power or compression and no skipping or back firing of the engine and no variation in the speed thereof. I have also inspected the engine cylinders constructed in accordance with the invention that have been in service for more than 9 months and have found no wear in the cylinders nor in the piston rings, other than normal wear, and while the piston and piston rings and ring grooves were coated with the usual soft coating of dirt and soft carbon, there was no trace whatever of any burning of the piston and no deposits of any of the injurious gritty carbon was found on any of the pistons nor on any of the rings nor in any of the ring grooves. Furthermore, these parts were all properly coated with lubricating oil used in lubricating the engine indicating that a proper distribution of lubricant on these parts had been effected.

Figure 4:
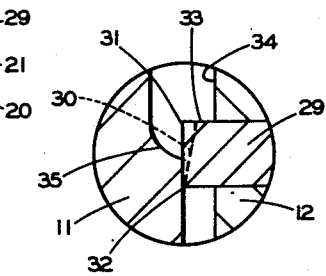
Fig. 4 is a still further enlarged fragmentary cross-sectional view of the cylinder wall, piston and piston ring shown in Figs. 1, 2 and 3, this view showing in particular the position of the piston ring nearest the combustion chamber of the engine cylinder when the piston is in closest proximity to the combustion chamber.

In these same cylinders I also found the counterbore, and the surface of the top ring facing the combustion chamber, this surface being indicated at 33 in Fig. 4, as well as the side wall portion 34 in Fig. 3, of the piston which extends from the piston ring 29 to the end of the piston all comparatively clean and free of any gritty carbon. While I do not wish to be bound by any theory, it is my opinion and belief that these surfaces are kept free from carbon deposits by the turbulence of the combustion gases which enter the counterbored portion of the cylinder and reaching the bottom of the counterbore and the upper ring are deflected back up again from the bottom 35 of the counterbore and the top surface 33 of the upper piston ring 29, and thereby forced out of the cylinder as indicated by the arrows in Fig. 3, thus effectively preventing the admission of these combustion gases and flakes of gritty carbon down past the piston ring 29 to the other rings and lower portions of the piston. Due to the turbulence of the combustion gas in this tortuous restricted conduit the surfaces of the cylinder liner, piston and cylinder head defining the same are maintained clean and free of gritty carbon deposits thereby extending the life of these parts far beyond the life heretofore obtained therefrom. It is also my opinion that the additional space afforded by the counterbore in the cylinder exposes the upper surface 33 of the upper ring 29 between the walls of the piston and the cylinder to the full power of the explosion of the engine, thus increasing the force tending to move the piston away from the combustion chamber of the engine.

Although I have described my invention with a certain degree of particularity, it is understood that the present disclosure has been made by way of example and that numerous changes in the details of construction and the combination and arrangement of parts may be resorted to without departing from the spirit of the invention which is defined by the following claims:

I claim:

1. In a cylinder and piston construction, a cylinder liner having a cylindrical wall, a cylinder head seated at one end of said liner, said head having a wall substantially in a plane with the said end of the liner, a piston having a cylindrical wall and an end wall, said cylindrical wall of the piston closely fitting in the cylindrical wall of the liner with a clearance space therebetween, said end wall having a peripheral marginal edge surface and a centrally disposed recess surface having a diameter less than the outside diameter of the piston and defining a cup-shaped fluid chamber of substantial depth in the central portion of the piston, the said piston adapted to have its peripheral marginal edge surface in close proximity to said cylinder head wall at predetermined intervals so as to form between the juxtapositioned cylinder head wall and the said peripheral marginal edge surface of the piston a narrow restricted disk-like conduit of substantially uniform depth extending from said recess surface of the piston to said cylindrical wall of the piston, said piston having an annular piston ring groove spaced from said end wall with a ring mounted therein, said ring having a flat cylindrical surface contacting the said cylindrical wall of the liner so as to seal the said clearance space, the cylindrical wall of the cylinder liner having a counterbore extending from the end thereof to a point in the cylindrical wall of the liner contacted by an intermediate portion of the flat cylindrical surface of said piston ring when the end wall of the said piston is at its closest proximity to said wall of said cylinder head, said counterbore having a diameter substantially equal to the maximum diameter to which the cylinder liner will normally be worn by the said ring during the life of the cylinder liner and defining with the cylindrical wall of the piston a restricted conduit which communicates with the disk-like conduit to form a restricted communication from said cup-shaped fluid chamber to said piston ring when the end wall of the said piston is at its closest proximity to said cylinder head wall.

2. In a cylinder and piston construction, a cylinder, a cylinder head seated at one end of said cylinder, said head having a level flat peripheral marginal wall substantially in a plane with the said end of the cylinder, a piston having a cylindrical wall and an end wall, said cylindrical wall of the piston closely fitting in the cylinder with a clearance space therebetween, said end wall having a level flat peripheral marginal edge surface and a centrally disposed recess surface and defining a cup-shaped fluid chamber of substantial depth in the central portion of the piston, said piston adapted to have its level flat peripheral marginal edge surface in close proximity to the said level flat peripheral marginal wall of the said cylinder head at predetermined intervals so as to form between the juxtapositioned peripheral marginal wall of the said cylinder head and the said peripheral marginal edge surface of the piston a narrow restricted disk-like conduit of substantially uniform depth extending from said recess surface of the piston to said cylinder wall of the piston, said piston having an annular ring groove spaced from said end wall with a ring mounted therein, said ring having a flat cylindrical surface contacting the said cylinder so as to seal the said clearance space, the cylinder having a counterbore extending from the end thereof to a point in the cylinder contacted by an intermediate portion of the flat cylindrical surface of said piston ring when the end wall of the said piston is at its closest proximity to said wall of said cylinder head, said counterbore having a diameter substantially equal to the maximum diameter to which the cylinder will normally be worn by the said ring during the life of the cylinder and defining with the cylindrical wall of the piston a narrow restricted annular conduit which communicates with the said narrow restricted disk-like conduit to form a restricted communication from said cup-shaped fluid chamber to said piston ring when the end wall of the said piston is at its closest proximity to said cylinder head wall.

RUDOLPH B. KLEINFELD.

REFERENCES CITED

The following references are of record in the file of this patent:

UNITED STATES PATENTS

| Number | Name | Date |
|---|---|---|
| 808,572 | Palmer | Dec. 26, 1905 |
| 909,531 | Brady | Jan. 12, 1909 |
| 1,345,808 | Reynolds | July 6, 1920 |
| 1,684,407 | Nibbs | Sept. 18, 1928 |
| 2,447,508 | Kleinfeld | Aug. 24, 1948 |